United States Patent [19]

Nagai et al.

[11] Patent Number: 5,777,020

[45] Date of Patent: Jul. 7, 1998

[54] THERMOPLASTIC RESIN COMPOSITION

[75] Inventors: Takayuki Nagai; Yasutoshi Jagawa, both of Toyota; Takeyoshi Nishio, Okazaki; Yukihito Zanka, Yokkaichi; Ikuo Tsutsumi, Yokkaichi; Izumi Ishii, Yokkaichi; Hiroki Sato, Yokkaichi; Hironari Sano, Yokkaichi, all of Japan

[73] Assignees: Japan Polychem Corporation, Tokyo-To; Toyota Jidosha Kabushiki Kaisha, Toyota, both of Japan

[21] Appl. No.: 749,506

[22] Filed: Nov. 15, 1996

[30] Foreign Application Priority Data

Nov. 17, 1995 [JP] Japan .................... 7-300030
Sep. 11, 1996 [JP] Japan .................... 8-240790

[51] Int. Cl.$^6$ .................................................. C08J 3/34
[52] U.S. Cl. ................................. 524/451; 524/505
[58] Field of Search ............................ 524/451, 505

[56] References Cited

FOREIGN PATENT DOCUMENTS 0 605 180  7/1994  European Pat. Off. .

OTHER PUBLICATIONS

Patent abstracts of Japan, vol. 95, No. 002, JP 07 053843, Feb. 28, 1995.

*Primary Examiner*—Peter D. Mulcahy
*Attorney, Agent, or Firm*—Oblon, Spivak, McClelland, Maier & Neustadt, P.C.

[57] ABSTRACT

A thermoplastic resin composition comprising (A) a propylene/ethylene block copolymer, (B) a combination of a low-crystalline ethylene/butene random copolymer resin and an amorphous ethylene/butene random copolymer rubber, or a combination of an ethylene/octene copolymer rubber and an ethylene/propylene copolymer rubber, (C) a specific block elastomer, and (D) talc. This composition has good injection molding properties, can reveal excellent flexural modulus, heat resistance and surface hardness, and is suitable for producing such injection-molded products as interior automotive trims.

9 Claims, No Drawings

THERMOPLASTIC RESIN COMPOSITION

BACKGROUND OF THE INVENTION

This invention relates to a thermoplastic resin composition which comprises (A) a propylene/ethylene block copolymer, (B) a combination of a low-crystalline ethylene/butene random copolymer resin and an amorphous ethylene/butene random copolymer rubber, or a combination of an ethylene/octene copolymer rubber and an ethylene/propylene copolymer rubber, (C) a specific block elastomer, and (D) talc, which has good injection molding properties, which shows excellent flexural modulus, heat resistance and surface hardness, and which is suitable for producing such injection-molded products as interior automotive trims.

Numerous attempts to improve impact resistance and rigidity have been hitherto made by incorporating ethylene/propylene copolymers or various ethylene copolymers and talc into polypropylene. For instance, compositions having high impact resistance have been known as described in Japanese Patent Publication No. 42929/1988, and Japanese Laid-Open Patent Publications Nos. 150/1989, 66263/1989 and 204946/1989.

However, the composition described in the above-mentioned Japanese Patent Publication No. 42929/1988 can reveal neither sufficiently high flexural modulus nor heat resistance. This is because polypropylene having extremely high crystallinity is not used in this composition. The compositions described in Japanese Laid-Open Patent Publications Nos. 150/1989, 66263/1989 and 204946/1989 are fit for such uses as bumpers because their talc contents are low. However, they reveal flexural modulus extremely lower than the one required for trims.

Furthermore, a composition containing an ethylene/alpha-olefin copolymer and a large amount of an inorganic filler is described in Japanese Patent Publication No. 159345/1992. This composition is, however, unfavorable from the viewpoint of weight-saving of automobiles because its specific gravity is high.

On the other hand, in order to overcome the aforementioned shortcomings, a composition has been proposed in Japanese Laid-Open Patent Publication No. 53843/1995. In those fields which require low-pressure high-cycle molding, materials having higher fluidity are demanded. To meet such a severe demand, the composition proposed is still insufficient in fluidity.

SUMMARY OF THE INVENTION

An object of the present invention is to solve the above-described problems, thereby providing a composition which has high fluidity and good molding properties, which can reveal good physical properties, and which is suitable for producing interior automotive trims such as installment panels.

It has now been found that a composition having high fluidity, good molding properties and excellent physical properties can be obtained by blending, in a specific ratio, (A) a propylene/ethylene block copolymer in which the propylene homopolymer moiety has high fluidity and extremely high crystallinity; (B) the following combination (B-1) or (B-2) of two different copolymers: (B-1) a combination of a resinous ethylene/butene random copolymer containing crystalline segments in its molecule and a substantially elastomeric ethylene/butene random copolymer containing few crystalline segments in its molecule, and (B-2) a combination of an ethylene/octene copolymer rubber containing crystalline segments in its molecule and an ethylene/propylene copolymer rubber containing few crystalline segments in its molecule; (C) a specific block elastomer consisting essentially of polyethylene structure (crystalline moiety) and ethylene/1-butene copolymer structure (random elastomer moiety), and (D) talc. The present invention has been accomplished on the basis of this finding.

Thus, the thermoplastic resin composition of the present invention comprises the following components (A) to (D):

component (A): 50 to 75% by weight of a propylene/ethylene block copolymer whose propylene homopolymer moiety has a melt flow rate (MFR: at 230° C. under a load of 2.16 kg) of 20 to 200 g/10 min and an isotactic pentad rate of 0.98 or higher, the MFR of the block copolymer being 10 to 100 g/10 min (at 230° C. under a load of 2.16 kg), the ratio (Mw/Mn) of the weight-average molecular weight (Mw) to the number-average molecular weight (Mn) of the block copolymer being from 5 to 7;

component (B) the following combination (B-1) or (B-2) of two different copolymers:

(B-1): the following two copolymers (B-1-1) and (B-1-2):

(B-1-1): 5 to 10% by weight of an ethylene/butene random copolymer resin having a melting temperature measured by a differential scanning calorimeter of 60° to 100° C. and an MFR of 0.5 to 10 g/10 min (at 230° C. under a load of 2.16 kg), and (B-1-2): 5 to 10% by weight of an ethylene/butene random copolymer rubber which does not have a melting temperature measured by a differential scanning calorimeter of higher than 30° C. and has an MFR of 0.5 to 10 g/10 min (at 230° C. under a load of 2.16 kg), (B-2): the following two copolymers (B-2-1) and (B-2-2):

(B-2-1): 7 to 15% by weight of an ethylene/octene random copolymer rubber having a melting temperature measured by a differential scanning calorimeter of 60° to 90° C. and an MFR of 1.0 to 20 g/10 min (at 230° C. under a load of 2.16 kg), and (B-2-2): 1 to 5% by weight of an ethylene/propylene copolymer rubber having a melting temperature measured by a differential scanning calorimeter of lower than 30° C., being substantially amorphous, having an MFR of 0.5 to 10 g/10 min (at 230° C. under a load of 2.16 kg);

component (C): 0.3 to 5% by weight of a block elastomer represented by the following formula [I] or [II], having a melting temperature measured by a differential scanning calorimeter of 80° to 110° C. and an MFR of 0.5 to 20 g/10 min (at 230° C. under a load of 2.16 kg), consisting of 20 to 40% by weight of polyethylene crystalline moiety and 60 to 80% by weight of random elastomer moiety: polyethylene moiety (ethylene/butene random elastomer moiety) polyethylene moiety [I] polyethylene moiety (ethylene/butene random elastomer moiety) [II]; and component (D): 15 to 25% by weight of talc having an average particle diameter of 5 micrometers or less and a specific surface area of 3.5 m²/g or more.

DETAILED DESCRIPTION OF THE INVENTION

[I] Components (A) Propylene/Ethylene Block Copolymer (Component (A))

A propylene/ethylene block copolymer having a melt flow rate (MFR: at 230° C. under a load of 2.16 kg) of 10 to 100 g/10 min, preferably 20 to 80 g/10 min, particularly 30 to 60 g/10 min is used as the component (A) of the thermoplastic resin composition of the present invention.

When a propylene/ethylene block copolymer having an MFR lower than the above-described range is used, the resulting thermoplastic resin composition is insufficient in fluidity. It is therefore necessary to use a molder with strong clamping force, or to increase the molding temperature when such a thermoplastic resin composition is molded into thin-walled products. The productivity is thus adversely affected. On the contrary, when a propylene/ethylene block copolymer having an MFR higher than the above-described range is used, the resulting thermoplastic resin composition cannot reveal good properties such as impact resistance.

The MFR of the above propylene/ethylene block copolymer can be adjusted during polymerization, or can be adjusted with an organic peroxide such as diacyl peroxide or dialkyl peroxide after polymerization.

Further, it is necessary that the ratio (Mw/Mn) of the weight-average molecular weight (Mw) to the number-average molecular weight (Mn) of the propylene/ethylene block copolymer, which shows the molecular weight distribution of the block copolymer, be in the range of 5 to 7, preferably in the range of 5.5 to 6.5. A propylene/ethylene block copolymer whose Mw/mn ratio is not within the above-described range provides a thermoplastic resin composition which reveals decreased impact strength.

The propylene homopolymer moiety of the propylene/ethylene block copolymer is required to have an MFR of 20 to 200 g/10 min, preferably 30 to 150 g/10 min, particularly 40 to 100 g/10 min, and an isotactic pentad rate of 0.98 or more, preferably 0.985 or more.

When the MFR of the propylene homopolymer moiety of the propylene/ethylene block copolymer is lower than the above-described range, the final thermoplastic resin composition is insufficient in fluidity. On the other hand, when the MFR is in excess of the above-described range, the final thermoplastic resin composition cannot reveal high impact resistance.

When the isotactic pentad rate (P) of the propylene homopolymer moiety of the propylene/ethylene block copolymer is lower than the above-described range, the final thermoplastic resin composition cannot reveal sufficiently high flexural modulus, so that such an isotactic pentad rate is not suitable.

The "isotactic pentad rate (P)" as used herein means the rate of isotactic segments in polypropylene molecular chain determined in terms of pentad by means of $^{13}$C-NMR.

Further, the ethylene content of the above propylene/ethylene block copolymer is preferably from 2 to 8% by weight, and that of the elastomer moiety of the propylene/ethylene block copolymer is preferably from 30 to 50% by weight. When the ethylene content of the block copolymer is lower than this range, the final thermoplastic resin composition tends to reveal poor heat resistance. On the other hand, when the ethylene content is in excess of the above range, the final thermoplastic resin composition cannot reveal sufficiently high flexural modulus and surface hardness.

A catalyst having high stereoregularity is used for the production of the above propylene/ethylene block copolymer.

Examples of the method for preparing the catalyst include a method in which a titanium trichloride composition obtained by reducing titanium tetrachloride with an organoaluminum compound, and then treating the resulting compound with various electron donors and acceptors is combined with an organoaluminum compound and an aromatic carboxylic acid ester (see Japanese Laid-Open Patent Publications Nos. 100806/1981, 120712/1981 and 104907/1983); and a method in which titanium tetrachloride and various electron donors are brought into contact with a magnesium halide to obtain a catalyst supported on a carrier (see Japanese Laid-Open Patent Publications Nos. 63310/1982, 43915/1988 and 83116/1988).

The propylene/ethylene block copolymer can be obtained by carrying out block copolymerization between propylene and ethylene in the presence of the above catalyst, by employing such a production method as the gas phase fluid bed, solution or slurry method.

It is important to incorporate the above propylene/ethylene block copolymer into the thermoplastic resin composition of the present invention in an amount of 50 to 75% by weight, preferably 53 to 72% by weight, more preferably 55 to 70% by weight, most preferably 58 to 70% by weight of the composition.

When the amount of the propylene/ethylene block copolymer is less than the above-described range, the thermoplastic resin composition cannot reveal high flexural modulus. On the contrary, when the amount of the block copolymer is more than the above-described range, the thermoplastic resin composition reveals impaired impact resistance.

(B) Component (B)

The combination (B-1) or (B-2) of two different copolymers, which will be hereinafter explained in detail, is used as the component (B) of the thermoplastic resin composition of the present invention.

The combination (B-1) is a combination of two copolymers (B-1-1) and (B-2-1) as described below.

Component (B-1-1):

The component (B-1-1) is an ethylene/butene random copolymer resin, and used in order to improve the impact resistance of the thermoplastic resin composition with its surface hardness maintained high. When the component (B-1-1) is used along with the component (B-1-2) and the component (C), which will be explained later, the resulting thermoplastic resin composition can have more well-balanced physical properties.

An ethylene/butene random copolymer resin having a melting temperature measured by a differential scanning calorimeter (DSC) of 60° to 100° C., preferably 65° to 90° C., particularly 70° to 80° C. is used as the componen (B-1-1).

An ethylene/butene random copolymer resin having a melting temperature lower than the above-described range has low crystallinity, so that such a copolymer resin canno impart sufficiently high surface hardness to the thermoplas tic resin composition. On the contrary, when an ethylene butene random copolymer resin having a melting tempera ture higher than the above range is used, the resultin thermoplastic resin composition cannot reveal sufficientl high impact resistance.

Any ethylene/butene random copolymer resin can be use for the present invention regardless of its butene content a long as it has a melting temperature in the above-describe range. An ethylene/butene random copolymer resin contain ing 15 to 25% by weight, particularly 17 to 23% by weigh of butene is preferred from the viewpoints of both impa resistance and surface hardness.

An ethylene/butene random copolymer resin having melt flow rate (MFR: at 230° C. under a load of 2.16 kg) 0.5 to 10 g/10 min, preferably 1 to 8 g/10 min, particular 2 to 7 g/10 min is used as the component (B-1-1).

When an ethylene/butene random copolymer resin havin an MFR either lower or higher than the above-describe range is used, the resulting thermoplastic resin composition reveals impaired impact resistance.

Further, an ethylene/butene random copolymer resin having a density of lower than 0.90 g/cm$^3$, particularly 0.87 to 0.89 g/cm$^2$ is preferable as the component (B-1-1) because, when such a random copolymer resin is used, the resulting thermoplastic resin composition can reveal improved impact resistance and surface hardness.

It is not necessary that the above ethylene/butene random copolymer resin itself be of one type, and a mixture of two or more of the random copolymer resins can be used.

The above ethylene/butene random copolymer resin can be obtained by copolymerizing ethylene and butene in the presence of an ion polymerization catalyst such as a Ziegler catalyst or Phillips catalyst, by employing such a production method as the gas phase fluid bed, solution or slurry method.

It is important to incorporate the ethylene/butene random copolymer resin, the component (B-1-1), into the thermoplastic resin composition of the present invention in an amount of 5 to 10% by weight, preferably 6 to 9% by weight of the composition.

When the amount of the ethylene/butene random copolymer resin is less than the above-described range, the thermoplastic resin composition reveals lowered Rockwell hardness. On the contrary, when the amount of the random copolymer resin is in excess of the above-described range, the thermoplastic resin composition reveals decreased flexural modulus.

Component (B-1-2)

The component (B-1-2) is an ethylene/butene random copolymer rubber, and used in order to impart high impact resistance to the thermoplastic resin composition of the invention.

An ethylene/butene random copolymer rubber which does not have a melting temperature measured by a differential scanning calorimeter (DSC) of higher than 30° C. and which is a substantially amorphous elastomer is suitable as the component (B-1-2). The ethylene/butene random copolymer rubber may either have a melting temperature of lower than 30° C. or have no melting temperature.

When an ethylene/butene random copolymer rubber having a melting temperature of 30° C. or higher is used, the resulting thermoplastic resin composition cannot reveal sufficiently high impact resistance.

An ethylene/butene random copolymer rubber having a melt flow rate (MFR: at 230° C. under a load of 2.16 kg) of 0.5 to 10 g/10 min, preferably 1 to 8 g/10 min, particularly 2 to 7 g/10 min is used as the component (B-1-2).

When the MFR of the above random copolymer rubber is not within the above range, the final thermoplastic resin composition cannot reveal sufficiently high impact resistance.

Further, an ethylene/butene random copolymer rubber having a density of less than 0.90 g/cm$^3$, particularly 0.87 to 0.89 g/cm$^3$ is favorable from the viewpoint of the impact resistance of the final thermoplastic resin composition.

It is not necessary that the above ethylene/butene random copolymer rubber itself be of one type, and a mixture of two or more of the random copolymer rubbers can be used.

The above ethylene/butene random copolymer rubber can be obtained, like the above-described component (B-1-1), by copolymerizing ethylene and butene in the presence of an ion polymerization catalyst such as a Ziegler catalyst or Phillips catalyst, by employing such a production method as the gas phase fluid bed, solution or slurry method.

Any ethylene/butene random copolymer rubber can be used regardless of its butene content as long as it is substantially amorphous and elastomeric. An ethylene/butene random copolymer rubber containing more than 25% by weight, particularly more than 30% by weight of butene is preferred because such a random copolymer rubber can impart improved impact resistance to the final thermoplastic resin composition.

It is important to incorporate the above ethylene/butene random copolymer rubber into the thermoplastic resin composition of the present invention in an amount of 5 to 10% by weight, preferably 6 to 9% by weight of the composition.

When the amount of the ethylene-butene random copolymer rubber is less than the above-described range, the thermoplastic resin composition reveals impaired impact resistance. On the contrary, when the amount of the random copolymer rubber is in excess of the above-described range, the thermoplastic resin composition reveals decreased flexural modulus.

The combination (B-2) is a combination of two copolymers (B-2-1) and (B-2-2) as described below.

Component (B-2-1):

The component (B-2-1) is an ethylene/octene random copolymer rubber, and used in order to improve the impact resistance of the thermoplastic resin composition or the invention with its surface hardness maintained high. When the component (B-2-1) is used along with the component (B-2-2) and the component (C), the resulting thermoplastic resin composition can reveal more well-balanced physical properties.

An ethylene/octene random copolymer rubber having a melting temperature measured by a differential scanning calorimeter (DSC) of 60° to 90° C., preferably 60° to 85° C., particularly 60° to 70° C. is suitable as the component (B-2-1). An ethylene/octene random copolymer rubber having a melting temperature lower than the above range has low crystallinity, so that such a rubber cannot impart sufficiently high surface hardness to the thermoplastic resin composition. On the contrary, when the melting temperature of the copolymer rubber is higher than the above range, the final thermoplastic resin composition cannot reveal sufficiently high impact resistance.

An ethylene/octene random copolymer rubber having a density of 0.90 g/cm$^3$ or lower, preferably 0.86 to 0.89 g/cm$^3$, particularly 0.865 to 0.880 g/cm$^3$ is suitable from the viewpoints of both impact resistance and surface hardness.

Any ethylene/octene random copolymer rubber can be used regardless of its octene content as long as it has a melting temperature in the above-described range. An ethylene/octene random copolymer rubber containing 10 to 17 mol %, preferably 12 to 17 mol % of octene is preferred from the viewpoints of both impact resistance and surface hardness.

The "octene content" as used herein is a value obtained by means of $^{13}$C-NMR in accordance with the description in *Macromolecules* vol. 15, pp. 353–360 and pp. 1402–1406 (1982).

The above ethylene/octene random copolymer rubber can be obtained by polymerization using a titanium compound such as a titanium halide, an organoaluminum-magnesium complex such as an alkyl aluminum-magnesium complex or an alkylalkoxy aluminum complex, an alkyl aluminum, a so-called Ziegler catalyst such as an alkyl aluminum chloride, or a metallocene compound as described in WO-91/04257. However, when the polymerization is carried out by using a metallocene compound, an ethylene/octene random copolymer rubber which is more effective can be obtained.

The polymerization can be carried out by employing such a production method as the gas phase fluid bed, solution or slurry method.

An ethylene/octene random copolymer rubber having a melt flow rate (at 230° C. under a load of 2.16 kg) of 1.0 to 20 g/10 min, preferably 5 to 16 g/10 min, more preferably 7 to 13 g/10 min is used as the component (B-2-1). When the MFR of the random copolymer rubber is either lower or higher than the above-described range, the final thermoplastic resin composition cannot reveal high impact resistance.

The amount of the above ethylene/octene random copolymer rubber incorporated into the thermoplastic resin composition is from 7 to 15% by weight, preferably from 8 to 12% by weight of the composition. When the amount of the random copolymer rubber is less than the above-described range, the thermoplastic resin composition cannot reveal sufficiently high impact resistance. On the contrary, when the amount of the random copolymer rubber is in excess of the above-described range, the thermoplastic resin composition cannot reveal sufficiently high flexural modulus.

It is not necessary that the above ethylene/octene random copolymer rubber itself be of one type, and a mixture of two or more of the random copolymer rubbers can be used.

Component (B-2-2):

The component (B-2-2) is an ethylene/propylene copolymer rubber, and used in order to impart high impact resistance to the thermoplastic resin composition. This component (B-2-2) is a substantially amorphous elastomer having a melting temperature measured by a differential scanning calorimeter (DSC) of lower than 30° C. When an ethylene/propylene copolymer rubber whose melting temperature is not within the above-described range is used, the resulting thermoplastic resin composition cannot reveal sufficiently high impact resistance, so that such a copolymer rubber is not suitable.

An ethylene/propylene copolymer rubber having a density of 0.88 g/cm$^3$ or less, particularly 0.85 to 0.87 g/cm$^3$ is suitable from the viewpoint of impact resistance.

The above ethylene/propylene copolymer rubber can be obtained by copolymerizing ethylene and propylene in the presence of an ion polymerization catalyst such as a Ziegler catalyst or Phillips catalyst, by employing such a production method as the gas phase fluid bed, solution or slurry method. Any ethylene/propylene copolymer rubber can be used regardless of its propylene content as long as it is substantially amorphous. An ethylene/propylene copolymer rubber containing 20 mol % or more, particularly 25 mol % or more of propylene is suitable from the viewpoint of impact resistance.

The MFR (at 230° C. under a load of 2.16 kg) of this ethylene/propylene copolymer rubber is from 0.5 to 10 g/10 min, preferably from 1 to 8 g/10 min, more preferably from 2 to 7 g/10 min. When the MFR of the above copolymer rubber is either lower or higher than this range, the impact-resistance-improving effect cannot be fully obtained.

The amount of the above ethylene/propylene copolymer rubber incorporated into the thermoplastic resin composition is from 1 to 5% by weight, preferably from 1 to 4% by weight of the composition. When the amount of the copolymer rubber is less than the above-described range, the thermoplastic resin composition cannot reveal sufficiently high impact resistance. On the contrary, when the amount of the copolymer rubber is in excess of the above-described range, the thermoplastic resin composition cannot reveal sufficiently high flexural modulus.

It is not necessary that the above ethylene/propylene copolymer rubber itself be of one type, and a mixture of two or more of the copolymer rubbers can be used.

(C) Block Elastomer (Component (C))

A block elastomer, the component (C) of the thermoplastic resin composition of the present invention, is used so that the impact-resistance-improving effect of the above component (B) can be more effectively obtained. Even when only a small amount of the block elastomer is added, this effect can be fully obtained.

The melting temperature of this block elastomer (component (C)) measured by a differential scanning calorimeter is from 80° to 110° C., preferably from 90° to 105° C. When a block elastomer whose melting temperature is not within the above-described range is used, the resulting thermoplastic resin composition cannot reveal sufficiently high impact resistance.

Further, the melt flow rate (MFR: at 230° C. under a load of 2.16 kg) of the block elastomer for use in the present invention is from 0.5 to 20 g/10 min, preferably from 0.5 to 15 g/10 min. When a block elastomer having an MFR either lower or higher than the above-described range is used, the resulting thermoplastic resin composition reveals decreased Izod impact strength.

The block elastomer (component (C)) contains as essential constituents polyethylene structure and elastomer structure. When either one of these structures is not present in the elastomer, the above-described effect cannot be fully obtained.

The block elastomer can be of triblock structure or of diblock structure represented by the following formula [I] or [II]:

polyethylene moiety(ethylene/butene random elastomer moiety)polyethylene moiety [I]

polyethylene moiety (ethylene/butene random moiety) [II]

The proportion of the crystalline moiety of the above polyethylene structure is from 20 to 40% by weight, preferably from 23 to 35% by weight. Further, the proportion of the moiety of the elastomer structure, ethylene/butene random elastomer moiety, is from 60 to 80% by weight, preferably from 65 to 77% by weight. The butene content (the rate of 1,2-polymerization) of the elastomer structure is preferably from 60 to 90% by weight, particularly from 65 to 85% by weight.

When any of these proportions is not within the above-described range, the final thermoplastic resin composition tends to reveal low impact resistance.

There is no particular limitation on the method for producing the block elastomer. For instance, the elastomer can be prepared in the following manner, by using the method and procedure described in Japanese Laid-Open Patent Publication No. 34513/1993.

For instance, after butadiene is 1,4-polymerized, the polymerization conditions are changed so that the 1,2 polymerization of butadiene can mainly occur. Thus, the rate of 1,2-polymerization can be increased by controlling the polarity of a solvent, or the like. If hydrogenation is carried out at this stage, an elastomer or diblock structure represented by the formula [II] is obtained. If hydrogenation is carried out after the above product is subjected to coupling treatment, an elastomer of triblock structure represented by the formula [I] can be obtained.

The so-called living polymerization method can be employed as a method for carrying out the above polymerization. The polymerization can be carried out in the same manner as is employed for obtaining a styrene elastomer such as SEBS (styrene/ethylene/butylene/styrene copolymer).

A block elastomer having a rate of 1,2-polymerization of 60 to 90% by weight, preferably 65 to 85% by weight is suitable as the component (C) for use in the present invention.

When the rate of the 1,2-polymerization is not within the above-described range, there is a tendency that the block elastomer cannot fully bring about the above-described effect.

The amount of the above block elastomer incorporated into the thermoplastic resin composition of the invention is from 0.3 to 5% by weight, preferably from 0.5 to 3% by weight, particularly from 0.75 to 3% by weight of the composition.

When the amount of the block elastomer is in excess of the above-described range, the thermoplastic resin composition reveals decreased Rockwell hardness. On the contrary, when the amount of the block elastomer is less than the above-described range, the aforementioned effect cannot be obtained.

(D) Talc (Component (D))

Physical Properties of Talc:

Talc used as the component (D) of the thermoplastic resin composition of the present invention has an average particle diameter of 5 micrometers of less, preferably 0.5 to 3 micrometers, and a specific surface area of 3.5 $m^2$/g or more, preferably 3.5 to 6 $M^2$/g. When the average particle diameter and specific surface area are not within the above respective ranges, the final thermoplastic resin composition reveals decreased flexural modulus.

The average particle diameter of the talc is a particle diameter at a cumulative quantity of 50% by weight on a particle size cumulative distribution curve which is obtained by a measurement carried out by the liquid layer sedimentation light transmission method (by using, for example, Model "CP" manufactured by Shimadzu Corp., Japan).

Further, the specific surface area of the talc can be determined by the air transmission method (by using, for example, a constant-pressure-aeration-type specific surface area measuring apparatus, Model "SS-100" manufactured by Shimadzu Corp., Japan).

The above defined talc can be generally prepared by means of dry grinding, followed by dry classification.

Talc whose surface has been treated with any of various organic titanate coupling agents, silane coupling agents, fatty acids, metallic salts of a fatty acid, and fatty acid esters can also be used in order to improve the adhesion between the talc and the polymers or the dispersibility of the talc in the polymers.

The amount of the talc incorporated into the thermoplastic resin composition of the invention is from 15 to 25% by weight, preferably from 17 to 23% by weight of the composition.

When the amount of the talc is less than the above-described range, the final thermoplastic resin composition cannot reveal sufficiently high flexural modulus. On the other hand, when the amount of the talc is in excess of the above-described range, the final thermoplastic resin composition reveals decreased tensile elongation.

(E) Additional Components (Optional Components)

In addition to the above-described essential five components (A), (B-1-1), (B-1-2), (C) and (D), or five components (A), (B-2-1), (B-2-2), (C) and (D), other additional components (component (E) ) can be added to the thermoplastic resin composition of the invention within such a limit that the effects of the present invention will not be remarkably marred.

Examples of such additional components (component (E) include antioxidants of phenol type and phosphorus type, deterioration-on-weathering inhibitors of hindered amine type, benzophenone type and benzotriazole type, nucleating agents such as aluminum compounds and phosphorus compounds, dispersing agents represented by metallic salts of stearic acid, coloring materials such as quinacridone, perylene, phthalocyanine and carbon black, fibrous potassium titanate, fibrous magnesium oxysulfate, fibrous aluminum borate, whisker of calcium carbonate, carbon fiber and glass fiber.

[II] Process for Producing Thermoplastic Resin Composition (1) Kneading

The thermoplastic resin composition of the present invention can be obtained by kneading, at a temperature of 180°–250° C., the five components (A), (B-1-1), (B-1-2), (C) and (D), or the five components (A), (B-2-1), (B-2-2), (C) and (D), and, if necessary, the component (E) by a conventional extruder, Banbury mixer, roller, Brabender Plastograph or kneader. Of these, an extruder, especially a twin-screw extruder is preferably used for producing the composition of the present invention.

(2) Molding

There is no particular limitation on the method for molding the thermoplastic resin composition of the present invention. However, the injection molding method is most suitable when the effects of the present invention to be obtained are taken into consideration.

[III] Thermoplastic Resin Composition (1) Physical Properties

The thermoplastic resin composition of the present invention produced by the above-described method has good injection molding properties, and reveals the following excellent physical properties of flexural modulus, impact resistance, tensile elongation, surface hardness and heat resistance:

(a) MFR: 20 g/10 min or more, preferably 25 g/10 min or more;

(b) flexural modulus: 20,000 kg/$cm^2$ or more, preferably 23,000 to 28,000 kg/$cm^2$;

(c) Izod impact strength (at 23° C.): 15 kg·cm/cm or more, preferably 18 kg·cm/cm or more;

(d) tensile elongation: 400% or more, preferably 500% or more;

(e) Rockwell hardness: 75 or more, preferably 80 or more; and (f) heat deformation temperature: 120° C. or higher, preferably 130° C or higher.

(2) Uses

Since the thermoplastic resin composition of the present invention has the above-described good physical properties, it can be used for obtaining a variety of molded products. In particular, it is preferable to injection mold the thermoplastic resin composition into such products as interior automotive trims, especially installment panels, console boxes, and the like.

(3) Effects of the Invention

The thermoplastic resin composition of the present invention has good injection molding properties, can reveal excellent appearance, flexural modulus, tensile elongation, heat resistance, surface hardness and impact resistance, and is suitable for producing injection-molded products such as interior automotive trims.

EXAMPLES

The present invention will now be explained more specifically by referring to the following examples. However, the present invention is not limited to or limited by the following examples.

[I] Measuring Methods (1) MFR: measured in accordance with ASTM-D1238, at a temperature of 230° C. under a load of 2.16 kg.

(2) Isotactic pentad rate (P): determined in accordance with the method described in *Macromolecules*, 8, 687 (1975), by using $^{13}$C-NMR.

(3) Melting temperature: A differential scanning calorimeter was used for the measurement. A sample was heated to a temperature of 180° C. and melted. Thereafter, the sample was cooled to a temperature of −100° C. at a rate of 10° C./min, and the temperature of the sample was then raised at a rate of 10° C./min, thereby obtaining a thermogram. The peak of the thermogram was taken as the melting temperature of the sample.

(4) Flexural modulus: measured in accordance with ASTM-D790, at a temperature of 23° C. and a bending rate of 2 mm/min.

(5) Impact resistance: evaluated by the Izod impact strength at 23° C. in accordance with ASTM-785.

(6) Tensile elongation: A tensile test was carried out in accordance with ASTM-D638 at a temperature of 23° C. and a stress rate of 10 mm/min, and the elongation was measured.

(7) Surface hardness: evaluated by the Rockwell hardness (at 23° C.) on the R-scale in accordance with ASTM-D785.

(8) Heat deformation temperature: measured in accordance with ASTM-D523 under a load of 4.6 kg.

(9) Ratio (Mw/Mn) of weight-average molecular weight to number-average molecular weight: determined by using GPC (gel permeation chromatography).

|II| Examples

Examples 1 to 15 & Comparative Examples 1 to 25

The components shown in Tables 1 to 5 were blended according to the formulations shown in Tables 6, 7 and 8. To each mixture were further added 0.1 parts by weight of tetrakis|methylene-3- (3', 5'-di-t-butyl-4'-hydroxyphenyl)-propionate|methane and 0.4 parts by weight of magnesium stearate. The mixture was mixed by a super mixer (manufactured by Kawata Mfg. Co., Ltd., Japan) for 5 minutes, and the resultant was kneaded and granulated by a two-roll kneader ("FCM" manufactured by Kobe Steel, Ltd., Japan) set at 210° C. Thermoplastic resin compositions were thus obtained.

Thereafter, the thermoplastic resin compositions were respectively molded, at a molding temperature of 210° C., into various types of specimens by using an injection molder with a clamping force of 100 tons, and the measurements were carried out by the above-described various methods. The results are shown in Tables 9 to 11.

TABLE 1

Ethylene/Propylene Block Copolymer

| Type | Propylene Homopolymer Moiety | | Block Copolymer | | Molecular Weight Distribution Mw/Mn |
|---|---|---|---|---|---|
| | MFR (g/10 min) | Isotactic Pentad Rate | MFR (g/10 min) | Ethylene Content (wt. %) | |
| PP-1 | 81 | 0.988 | 45 | 4.5 | 5.7 |
| PP-2 | 125 | 0.983 | 68 | 4.3 | 5.8 |
| PP-3 | 50 | 0.986 | 28 | 4.3 | 6.3 |
| PP-4 | 238 | 0.981 | 120 | 3.9 | 5.2 |
| PP-5 | 14 | 0.981 | 8 | 4.7 | 6.1 |
| PP-6 | 77 | 0.963 | 43 | 4.1 | 5.5 |
| PP-7 | 120 | 0.989 | 47 | 4.8 | 8.3 |
| PP-8 | 53 | 0.985 | 49 | 4.2 | 4.4 |

TABLE 2

Component (B-1-1)

| Type | MFR (g/10 min) | Melting Temperature (°C.) |
|---|---|---|
| PEX-1 | 6.5 | 80 |
| PEX-2 | 7.0 | 103 |
| PEX-3 | 9.1 | 78 |
| PEX-4 | 4.8 | 79 |
| PEX-5 | 21 | 80 |
| PEX-6 | 0.4 | 81 |
| PEX-7 | 6.1 | 42 |

TABLE 3

Component (B-1-2)

| Type | MFR (g/10 min) | Melting Temperature (°C.) |
|---|---|---|
| PEX-3 | 6.3 | 26 |
| PEX-9 | 9.2 | 28 |
| PEX-10 | 4.9 | 28 |
| PEX-11 | 23 | 26 |
| PEX-12 | 0.3 | 26 |
| PEX-13 | 5.9 | 53 |

TABLE 4

Component (C)

| Type | PE Moiety Proportion (wt. %) | Elastomer Moiety | | MFR | Melting Temperature | Structure |
|---|---|---|---|---|---|---|
| | | Proportion (wt. %) | Rate of 1,2-Polymerization (wt. %) | | | |
| Elastomer-1 | 30 | 70 | 78 | 2.8 | 99.7 | Triblock |
| Elastomer-2 | 27 | 73 | 74 | 13 | 99.9 | Triblock |
| Elastomer-3 | 29 | 71 | 70 | 1.2 | 98.3 | Triblock |
| Elastomer-4 | 28 | 72 | 75 | 100 | 99.2 | Triblock |
| Elastomer-5 | 31 | 69 | 74 | 0.1 | 98 | Triblock |
| Elastomer-6 | 99 | 1 | 80 | 2.5 | 118 | Triblock |
| Elastomer-7 | 5 | 95 | 76 | 3.1 | 45 | Triblock |
| Elastomer-8 | 32 | 68 | 73 | 2.2 | 99.5 | Diblock |

TABLE 5

Component (D)

| Type | Average Particle Diameter (μm) | Specific Surface Area (m²/g) |
|---|---|---|
| Talc-1 | 2.8 | 4.0 |
| Talc-2 | 6.5 | 2.8 |

TABLE 6

|  | Component (A) |  | Component (B-1-1) |  | Component (B-1-2) |  | Component (C) |  | Talc (D) |  |
|---|---|---|---|---|---|---|---|---|---|---|
|  | Type | (wt. %) | Type | (wt. %) | Type | (wt. %) | Type | (wt. %) | Type | (wt. %) |
| Example 1 | PP-1 | 63 | PEX-1 | 8 | PEX-8 | 8 | Elastomer-1 | 1 | Talc 1 | 20 |
| Example 2 | PP-1 | 67 | PEX-1 | 6 | PEX-8 | 6 | Elastomer-1 | 1 | Talc 1 | 20 |
| Example 3 | PP-1 | 70 | PEX-1 | 6 | PEX-8 | 6 | Elastomer-1 | 1 | Talc 1 | 17 |
| Example 4 | PP-1 | 66 | PEX-1 | 8 | PEX-8 | 8 | Elastomer-1 | 1 | Talc 1 | 17 |
| Example 5 | PP-1 | 58 | PEX-1 | 8 | PEX-B | 8 | Elastomer-1 | 1 | Talc 1 | 25 |
| Example 6 | PP-1 | 63 | PEX-1 | 6 | PEX-8 | 10 | Elastomer-1 | 1 | Talc 1 | 20 |
| Example 7 | PP-1 | 63 | PEX-1 | 10 | PEX-8 | 6 | Elastomer-1 | 1 | Talc 1 | 20 |
| Example 8 | PP-1 | 63 | PEX-1 | 7 | PEX-8 | 7 | Elastomer-1 | 3 | Talc 1 | 20 |
| Example 9 | PP-2 | 63 | PEX-1 | 8 | PEX-8 | 8 | Elastomer-1 | 1 | Talc 1 | 20 |
| Example 10 | PP-3 | 63 | PEX-1 | 8 | PEX-8 | 8 | Elastomer-1 | 1 | Talc 1 | 20 |
| Example 11 | PP-1 | 63 | PEX-3 | 8 | PEX-9 | 8 | Elastomer-1 | 1 | Talc 1 | 20 |
| Example 12 | PP-1 | 63 | PEX-4 | 8 | PEX-10 | 8 | Elastomer-1 | 1 | Talc 1 | 20 |
| Example 13 | PP-1 | 63 | PEX-1 | 8 | PEX-8 | 8 | Elastomer-2 | 1 | Talc 1 | 20 |
| Example 14 | PP-1 | 63 | PEX-1 | 8 | PEX-8 | 8 | Elastomer-3 | 1 | Talc 1 | 20 |
| Example 15 | PP-1 | 63 | PEX-1 | 8 | PEX-8 | 8 | Elastomer-8 | 1 | Talc 1 | 20 |

TABLE 7

|  | Component (A) |  | Component (B-1-1) |  | Component (B-1-2) |  | Component (C) |  | Talc (D) |  |
|---|---|---|---|---|---|---|---|---|---|---|
|  | Type | (wt. %) | Type | (wt. %) | Type | (wt. %) | Type | (wt. %) | Type | (wt. %) |
| Comparative Example 1 | PP-1 | 77 | PEX-1 | 1 | PEX-8 | 1 | Elastomer-1 | 1 | Talc 1 | 20 |
| Comparative Example 2 | PP-1 | 40 | PEX-1 | 20 | PEX-8 | 20 | Elastomer-1 | 1 | Talc 1 | 20 |
| Comparative Example 3 | PP-1 | 54 | PEX-1 | 20 | PEX-8 | 8 | Elastomer-1 | 1 | Talc 1 | 17 |
| Comparative Example 4 | PP-1 | 54 | PEX-1 | 8 | PEX-8 | 20 | Elastomer-1 | 1 | Talc 1 | 17 |
| Comparative Example 5 | PP-1 | 63 | PEX-1 | 4 | PEX-8 | 10 | Elastomer-1 | 3 | Talc 1 | 20 |
| Comparative Example 6 | PP-1 | 67 | PEX-1 | 8 | PEX-8 | 4 | Elastomer-1 | 1 | Talc 1 | 20 |
| Comparative Example 7 | PP-1 | 68 | PEX-1 | 6 | PEX-8 | 6 | Elastomer-1 | 0 | Talc 1 | 20 |
| Comparative Example 8 | PP-1 | 63 | PEX-1 | 3 | PEX-8 | 3 | Elastomer-1 | 11 | Talc 1 | 20 |
| Comparative Example 9 | PP-1 | 73 | PEX-1 | 8 | PEX-8 | 8 | Elastomer-1 | 1 | Talc 1 | 10 |
| Comparative Example 10 | PP-1 | 53 | PEX-1 | 8 | PEX-8 | 8 | Elastomer-1 | 1 | Talc 1 | 30 |
| Comparative Example 11 | PP-4 | 61 | PEX-1 | 8 | PEX-8 | 8 | Elastomer-1 | 1 | Talc 1 | 20 |
| Comparative Example 12 | PP-5 | 63 | PEX-1 | 8 | PEX-8 | 8 | Elastomer-1 | 1 | Talc 1 | 20 |
| Comparative Example 13 | PP-6 | 63 | PEX-1 | 8 | PEX-8 | 8 | Elastomer-1 | 1 | Talc 1 | 20 |
| Comparative Example 14 | PP-7 | 63 | PEX-1 | 8 | PEX-8 | 8 | Elastomer-1 | 1 | Talc 1 | 20 |
| Comparative Example 15 | PP-8 | 63 | PEX-1 | 8 | PEX-8 | 8 | Elastomer-1 | 1 | Talc 1 | 20 |

TABLE 8

|  | Component (A) |  | Component (B-1-1) |  | Component (B-1-2) |  | Component (C) |  | Talc (D) |  |
|---|---|---|---|---|---|---|---|---|---|---|
|  | Type | (wt. %) | Type | (wt. %) | Type | (wt. %) | Type | (wt. %) | Type | (wt. %) |
| Comparative Example 16 | PP-1 | 63 | PEX-7 | 8 | PEX-8 | 9 | Elastomer-1 | 1 | Talc 1 | 20 |
| Comparative Example 17 | PP-1 | 67 | PEX-2 | 6 | PEX-8 | 6 | Elastomer-1 | 1 | Talc 1 | 20 |
| Comparative Example 18 | PP-1 | 67 | PEX-5 | 6 | PEX-11 | 6 | Elastomer-1 | 1 | Talc 1 | 20 |
| Comparative Example 19 | PP-1 | 67 | PEX-6 | 6 | PEX-12 | 6 | Elastomer-1 | 1 | Talc 1 | 20 |
| Comparative Example 20 | PP-1 | 63 | PEX-1 | 8 | PEX-13 | 8 | Elastomer-1 | 1 | Talc 1 | 20 |
| Comparative | PP-1 | 67 | PEX-1 | 6 | PEX-8 | 6 | Elastomer-4 | 1 | Talc 1 | 20 |

TABLE 8-continued

| | Component (A) | | Component (B-1-1) | | Component (B-1-2) | | Component (C) | | Talc (D) | |
|---|---|---|---|---|---|---|---|---|---|---|
| | Type | (wt. %) | Type | (wt. %) | Type | (wt. %) | Type | (wt. %) | Type | (wt. %) |
| Example 21 Comparative Example 22 | PP-1 | 67 | PEX-1 | 6 | PEX-8 | 6 | Elastomer-5 | 1 | Talc 1 | 20 |
| Comparative Example 23 | PP-1 | 67 | PEX-1 | 6 | PEX-8 | 6 | Elastomer-6 | 1 | Talc 1 | 20 |
| Comparative Example 24 | PP-1 | 63 | PEX-1 | 6 | PEX-8 | 6 | Elastomer-7 | 1 | Talc 1 | 20 |
| Comparative Example 25 | PP-1 | 67 | PEX-1 | 7 | PEX-8 | 7 | Elastomer-1 | 3 | Talc 2 | 20 |

TABLE 9

| | MFR (g/10 min) | Flexural Modulus (kg/cm$^2$) | Izod Impact Strength (kg · cm/cm) | Tensile Elongation (%) | Surface Hardness | Heat Deformation Temperature (°C.) |
|---|---|---|---|---|---|---|
| Example 1 | 29 | 26,000 | 26 | 500 or more | 81 | 131 |
| Example 2 | 32 | 27,500 | 16 | 500 or more | 83 | 135 |
| Example 3 | 33 | 26,100 | 16 | 500 or more | 88 | 131 |
| Example 4 | 30 | 24,600 | 24 | 500 or more | 81 | 129 |
| Example 5 | 38 | 20,700 | 22 | 500 or more | 80 | 134 |
| Example 6 | 30 | 25,100 | 28 | 500 or more | 78 | 130 |
| Example 7 | 28 | 26,200 | 20 | 500 or more | 83 | 132 |
| Example 8 | 27 | 24,500 | 38 | 500 or more | 76 | 129 |
| Example 9 | 35 | 27,000 | 18 | 500 or more | 82 | 132 |
| Example 10 | 21 | 25,800 | 20 | 500 or more | 81 | 129 |
| Example 11 | 38 | 26,100 | 19 | 500 or more | 81 | 130 |
| Example 12 | 26 | 25,700 | 16 | 500 or more | 80 | 133 |
| Example 13 | 30 | 25,000 | 20 | 500 or more | 81 | 130 |
| Example 14 | 28 | 26,100 | 19 | 500 or more | 82 | 131 |
| Example 15 | 30 | 25,900 | 26 | 500 or more | 80 | 128 |

TABLE 10

| | MFR (g/10 min) | Flexural Modulus (kg/cm$^2$) | Izod Impact Strength (kg · cm/cm) | Tensile Elongation (%) | Surface Hardness | Heat Deformation Temperature (°C.) |
|---|---|---|---|---|---|---|
| Comparative Example 1 | 41 | 31,000 | 4 | 13 | 97 | 140 |
| Comparative Example 2 | 16 | 16,000 | 50 or more | 500 or more | 57 | 110 |
| Comparative Example 3 | 25 | 19,300 | 50 or more | 500 or more | 68 | 119 |
| Comparative Example 4 | 25 | 19,100 | 50 or more | 500 or more | 63 | 118 |
| Comparative Example 5 | 28 | 24,300 | 40 | 500 or more | 73 | 128 |
| Comparative Example 6 | 31 | 27,600 | 14 | 500 or more | 84 | 135 |
| Comparative Example 7 | 32 | 28,000 | 13 | 380 | 84 | 135 |
| Comparative Example 8 | 25 | 22,000 | 30 | 500 or more | 72 | 124 |
| Comparative Example 9 | 31 | 19,000 | 17 | 500 or more | 79 | 127 |
| Comparative Example 10 | 28 | 31,000 | 21 | 203 | 77 | 135 |
| Comparative Example 11 | 63 | 26,800 | 11 | 30 | 83 | 133 |
| Comparative Example 12 | 6 | 24,100 | 22 | 500 or more | 80 | 128 |
| Comparative Example 13 | 28 | 18,500 | 24 | 500 or more | 79 | 127 |
| Comparative Example 14 | 26 | 26,700 | 13 | 430 | 81 | 133 |
| Comparative Example 15 | 32 | 25,900 | 14 | 300 | 78 | 130 |

TABLE 11

|  | MFR (g/10 min) | Flexural Modulus (kg/cm$^2$) | Izod Impact Strength (kg·cm/cm) | Tensile Elongation (%) | Surface Hardness | Heat Deformation Temperature (°C.) |
|---|---|---|---|---|---|---|
| Comparative Example 16 | 30 | 25,600 | 27 | 500 or more | 73 | 129 |
| Comparative Example 17 | 31 | 27,700 | 13 | 450 | 85 | 133 |
| Comparative Example 18 | 37 | 25,200 | 12 | 100 | 82 | 129 |
| Comparative Example 19 | 20 | 26,500 | 8 | 34 | 85 | 132 |
| Comparative Example 20 | 31 | 26,400 | 14 | 500 or more | 85 | 132 |
| Comparative Example 21 | 30 | 25,400 | 13 | 210 | 83 | 128 |
| Comparative Example 22 | 28 | 26,700 | 12 | 500 or more | 84 | 129 |
| Comparative Example 23 | 31 | 27,700 | 13 | 500 or more | 84 | 131 |
| Comparative Example 24 | 29 | 25,900 | 14 | 500 or more | 83 | 130 |
| Comparative Example 25 | 28 | 19,800 | 30 | 500 or more | 76 | 126 |

Examples 16 to 29 & Comparative Examples 26 to 46

The components shown in Tables 12 to 16 were blended according to the formulations shown in Tables 17, 18 and 19. To each mixture were further added 0.1 parts by weight of tetrakis |methylene-3-(3', 5'-di-t-butyl-4'-hydroxyphenyl)-propionate|methane and 0.4 parts by weight of magnesium stearate. The mixture was mixed by a super mixer (manufactured by Kawata Mfg. Co., Ltd., Japan) for 5 minutes, and the resultant was kneaded and granulated by a two-roll kneader ("FCM" manufactured by Kobe Steel, Ltd., Japan) set at 210° C. Thermoplastic resin compositions were thus obtained.

Thereafter, the thermoplastic resin compositions were respectively molded, at a molding temperature of 210° C., into various types of specimens by using an injection molder with a clamping force of 350 tons, and the measurements were carried out by the above-described various methods. The results are shown in Tables 20, 21 and 22.

TABLE 12

| Component (A): Propylene/Ethylene Block Copolymer | | | | | | |
|---|---|---|---|---|---|---|
| | Propylene Homopolymer Moiety | | Copolymer Moiety | | Ethylene | Molecular Weight |
| Type | MFR (g/10 min) | Isotactic Pentad Rate | Ethylene Content (wt. %) | MFR (g/10 min) | Content (wt. %) | Distribution Mw/Mn |
| PP-11 | 81 | 0.988 | 40 | 45 | 4.5 | 5.7 |
| PP-12 | 125 | 0.983 | 40 | 68 | 4.3 | 5.8 |
| PP-13 | 50 | 0.991 | 41 | 31 | 4.3 | 6.3 |
| PP-14 | 210 | 0.981 | 38 | 120 | 3.9 | 5.2 |
| PP-15 | 14 | 0.981 | 43 | 8 | 4.7 | 6.1 |
| PP-16 | 77 | 0.963 | 40 | 43 | 4.1 | 5.5 |
| PP-17 | 120 | 0.989 | 41 | 47 | 4.8 | 8.3 |
| PP-18 | 53 | 0.985 | 40 | 49 | 4.2 | 4.4 |

TABLE 13

Component (B-2-1): Ethylene/Octene Random Copolymer Rubber

| Type | MFR (g/10 min) | Melting Temperature (°C.) | Density (g/cm²) | Octene Content (mol %) |
|---|---|---|---|---|
| PEX-21 | 9.3 | 65 | 0.872 | 13 |
| PEX-22 | 10 | 105 | 0.908 | 5 |
| PEX-23 | 18 | 67 | 0.878 | 11 |
| PEX-24 | 4 | 63 | 0.869 | 14 |
| PEX-25 | 30 | 68 | 0.873 | 13 |
| PEX-26 | 0.7 | 64 | 0.87 | 13 |
| PEX-27 | 9.9 | 30 | 0.858 | 18 |

TABLE 14

Component (B-2-2): Ethylene/Propylene Copolymer Rubber

| Type | MFR (g/10 min) | Melting Temperature (°C.) | Density (g/cm²) | Octene Content (mol %) |
|---|---|---|---|---|
| EPR-1 | 6.3 | 19 | 0.862 | 25 |
| EPR-2 | 9.2 | 17 | 0.861 | 26 |
| EPR-3 | 2 | 19 | 0.862 | 24 |
| EPR-4 | 23 | 20 | 0.867 | 24 |
| EPR-5 | 0.4 | 20 | 0.868 | 23 |
| EPR-6 | 5.9 | 55 | 0.882 | 16 |

TABLE 15

Component (C): Block Elastomer

| Type | Melting Temperature (°C.) | MFR (g/10 min) | PE Moiety Proportion (wt. %) | Elastomer Moiety Proportion (wt. %) | Rate of 1-2-Polymerization (wt. %) | Structure |
|---|---|---|---|---|---|---|
| Elastomer-11 | 99.7 | 2.8 | 30 | 70 | 78 | Triblock |
| Elastomer-12 | 99.9 | 13 | 27 | 73 | 74 | Triblock |
| Elastomer-13 | 98.3 | 1.2 | 29 | 71 | 70 | Triblock |
| Elastomer-14 | 99.2 | 100 | 28 | 72 | 75 | Triblock |
| Elastomer-15 | 98 | 0.1 | 31 | 69 | 74 | Triblock |
| Elastomer-16 | 113 | 2.5 | 80 | 20 | 80 | Triblock |
| Elastomer-17 | 45 | 3.1 | 5 | 95 | 76 | Triblock |
| Elastomer-18 | 99.5 | 2.2 | 32 | 68 | 73 | Diblock |

TABLE 16

Talc

| Type | Average Particle Diameter (μm) | Specific Surface Area (m²g) |
|---|---|---|
| Talc-11 | 2.8 | 4.0 |
| Talc-12 | 6.8 | 2.8 |

TABLE 17

| | Component (A) | | Component (B-2-1) | | Component (B-2-2) | | Component (C) | | Talc (D) | |
|---|---|---|---|---|---|---|---|---|---|---|
| | Type | (wt. %) | Type | (wt. %) | Type | (wt. %) | Type | (wt. %) | Type | (wt. %) |
| Example 16 | PP-11 | 63 | PEX-21 | 12 | EPR-1 | 4 | Elastomer-11 | 1 | Talc 11 | 20 |
| Example 17 | PP-11 | 60 | PEX-21 | 15 | EPR-1 | 4 | Elastomer-11 | 1 | Talc 11 | 20 |
| Example 18 | PP-11 | 66 | PEX-21 | 9 | EPR-1 | 4 | Elastomer-11 | 1 | Talc 11 | 20 |
| Example 19 | PP-11 | 65 | PEX-21 | 12 | EPR-1 | 2 | Elastomer-11 | 1 | Talc 11 | 20 |
| Example 20 | PP-11 | 58 | PEX-21 | 12 | EPR-1 | 4 | Elastomer-11 | 1 | Talc 11 | 25 |
| Example 21 | PP-11 | 66 | PEX-21 | 12 | EPR-1 | 4 | Elastomer-11 | 1 | Talc 11 | 17 |
| Example 22 | PP-11 | 61 | PEX-21 | 12 | EPR-1 | 4 | Elastomer-11 | 3 | Talc 11 | 20 |
| Example 23 | PP-12 | 63 | PEX-21 | 12 | EPR-1 | 4 | Elastomer-11 | 1 | Talc 11 | 20 |
| Example 24 | PP-13 | 63 | PEX-21 | 12 | EPR-1 | 4 | Elastomer-11 | 1 | Talc 11 | 20 |
| Example 25 | PP-11 | 63 | PEX-23 | 12 | EPR-2 | 4 | Elastomer-11 | 1 | Talc 11 | 20 |
| Example 26 | PP-11 | 63 | PEX-24 | 12 | EPR-3 | 4 | Elastomer-11 | 1 | Talc 11 | 20 |
| Example 27 | PP-11 | 63 | PEX-21 | 12 | EPR-1 | 4 | Elastomer-12 | 1 | Talc 11 | 20 |
| Example 28 | PP-11 | 63 | PEX-21 | 12 | EPR-1 | 4 | Elastomer-13 | 1 | Talc 11 | 20 |
| Example 29 | PP-11 | 63 | PEX-21 | 12 | EPR-1 | 4 | Elastomer-18 | 1 | Talc 11 | 20 |

TABLE 18

| | Component (A) | | Component (B-2-1) | | Component (B-2-2) | | Component (C) | | Talc (D) | |
|---|---|---|---|---|---|---|---|---|---|---|
| | Type | (wt. %) | Type | (wt. %) | Type | (wt. %) | Type | (wt. %) | Type | (wt. % |
| Comparative Example 26 | PP-11 | 76 | PEX-21 | 3 | EPR-1 | 0 | Elastomer-11 | 1 | Talc 11 | 20 |
| Comparative Example 27 | PP-11 | 49 | PEX-21 | 20 | EPR-1 | 10 | Elastomer-11 | 1 | Talc 11 | 20 |
| Comparative Example 28 | PP-11 | 67 | PEX-21 | 9 | EPR-1 | 4 | Elastomer-11 | 0 | Talc 11 | 20 |
| Comparative Example 29 | PP-11 | 53 | PEX-21 | 12 | EPR-1 | 4 | Elastomer-11 | 11 | Talc 11 | 20 |

TABLE 18-continued

|  | Component (A) |  | Component (B-2-1) |  | Component (B-2-2) |  | Component (C) |  | Talc (D) |  |
|---|---|---|---|---|---|---|---|---|---|---|
|  | Type | (wt. %) | Type | (wt. %) | Type | (wt. %) | Type | (wt. %) | Type | (wt. %) |
| Comparative Example 30 | PP-11 | 70 | PEX-21 | 15 | EPR-1 | 4 | Elastomer-11 | 1 | Talc 11 | 10 |
| Comparative Example 31 | PP-11 | 56 | PEX-21 | 9 | EPR-1 | 4 | Elastomer-11 | 1 | Talc 11 | 30 |
| Comparative Example 32 | PP-14 | 66 | PEX-21 | 9 | EPR-1 | 4 | Elastomer-11 | 1 | Talc 11 | 20 |
| Comparative Example 33 | PP-15 | 60 | PEX-21 | 15 | EPR-1 | 4 | Elastomer-11 | 1 | Talc 11 | 20 |
| Comparative Example 34 | PP-16 | 60 | PEX-21 | 15 | EPR-1 | 4 | Elastomer-11 | 1 | Talc 11 | 20 |
| Comparative Example 35 | PP-17 | 66 | PEX-21 | 9 | EPR-1 | 4 | Elastomer-11 | 1 | Talc 11 | 20 |
| Comparative Example 36 | PP-18 | 66 | PEX-21 | 9 | EPR-2 | 4 | Elastomer-11 | 1 | Talc 11 | 20 |
| Comparative Example 37 | PP-11 | 60 | PEX-27 | 15 | EPR-1 | 4 | Elastomer-11 | 1 | Talc 11 | 20 |
| Comparative Example 38 | PP-11 | 66 | PEX-22 | 9 | EPR-1 | 4 | Elastomer-11 | 1 | Talc 11 | 20 |
| Comparative Example 39 | PP-11 | 66 | PEX-25 | 9 | EPR-4 | 4 | Elastomer-11 | 1 | Talc 11 | 20 |
| Comparative Example 40 | PP-11 | 66 | PEX-26 | 9 | EPR-5 | 4 | Elastomer-11 | 1 | Talc 11 | 20 |

TABLE 19

|  | Component (A) |  | Component (B-2-1) |  | Component (B-2-2) |  | Component (C) |  | Talc (D) |  |
|---|---|---|---|---|---|---|---|---|---|---|
|  | Type | (wt. %) | Type | (wt. %) | Type | (wt. %) | Type | (wt. %) | Type | (wt. %) |
| Comparative Example 41 | PP-11 | 66 | PEX-21 | 9 | EPR-6 | 4 | Elastomer-11 | 1 | Talc 11 | 20 |
| Comparative Example 42 | PP-11 | 63 | PEX-24 | 12 | EPR-3 | 4 | Elastomer-14 | 1 | Talc 11 | 20 |
| Comparative Example 43 | PP-11 | 63 | PEX-24 | 12 | EPR-3 | 4 | Elastomer-15 | 1 | Talc 11 | 20 |
| Comparative Example 44 | PP-11 | 63 | PEX-24 | 12 | EPR-3 | 4 | Elastomer-16 | 1 | Talc 11 | 20 |
| Comparative Example 45 | PP-11 | 63 | PEX-24 | 12 | EPR-3 | 4 | Elastomer-17 | 1 | Talc 11 | 20 |
| Comparative Example 46 | PP-11 | 60 | PEX-21 | 15 | EPR-1 | 4 | Elastomer-11 | 1 | Talc 12 | 20 |

TABLE 20

|  | MFR (g/10 min) | Flexural Modulus (kg/cm$^2$) | Izod Impact Strength (kg·cm/cm$^2$) | Tensile Elongation (%) | Surface Hardness | Heat Deformation Temperature (°C.) |
|---|---|---|---|---|---|---|
| Example 16 | 30 | 25,100 | 35 | 500 or more | 82 | 130 |
| Example 17 | 27 | 23,000 | 50 or more | 500 or more | 76 | 127 |
| Example 18 | 30 | 27,900 | 18 | 500 or more | 91 | 133 |
| Example 19 | 31 | 26,800 | 23 | 500 or more | 87 | 131 |
| Example 20 | 26 | 28,000 | 31 | 500 or more | 91 | 135 |
| Example 21 | 31 | 23,800 | 30 | 500 or more | 81 | 128 |
| Example 22 | 27 | 24,100 | 28 | 500 or more | 79 | 128 |
| Example 23 | 40 | 26,300 | 20 | 500 or more | 86 | 130 |
| Example 24 | 21 | 24,000 | 41 | 500 or more | 78 | 128 |
| Example 25 | 33 | 24,200 | 30 | 500 or more | 79 | 127 |
| Example 26 | 24 | 25,500 | 16 | 500 or more | 83 | 133 |
| Example 27 | 29 | 24,700 | 31 | 500 or more | 81 | 128 |
| Example 28 | 27 | 25,200 | 28 | 500 or more | 82 | 129 |
| Example 29 | 27 | 24,800 | 33 | 500 or more | 81 | 131 |

TABLE 21

|  | MFR (g/10 min) | Flexural Modulus (kg/cm$^2$) | Izod Impact Strength (kg · cm/cm$^2$) | Tensile Elongation (%) | Surface Hardness | Heat Deformation Temperature (°C.) |
| --- | --- | --- | --- | --- | --- | --- |
| Comparative Example 26 | 40 | 31,700 | 4 | 110 | 102 | 139 |
| Comparative Example 27 | 23 | 18,000 | 50 or more | 500 or more | 59 | 118 |
| Comparative Example 28 | 34 | 27,100 | 11 | 500 or more | 88 | 133 |
| Comparative Example 29 | 22 | 19,800 | 50 or more | 500 or more | 63 | 115 |
| Comparative Example 30 | 29 | 19,500 | 50 or more | 500 or more | 79 | 122 |
| Comparative Example 31 | 31 | 31,300 | 50 or more | 20 | 74 | 120 |
| Comparative Example 32 | 58 | 26,600 | 5 | 105 | 87 | 232 |
| Comparative Example 33 | 7 | 21,000 | 50 or more | 500 or more | 73 | 124 |
| Comparative Example 34 | 27 | 17,100 | 50 or more | 500 or more | 59 | 117 |
| Comparative Example 35 | 33 | 28,100 | 13 | 500 or more | 89 | 133 |
| Comparative Example 36 | 33 | 26,700 | 11 | 500 or more | 87 | 130 |
| Comparative Example 37 | 26 | 22,000 | 50 or more | 500 or more | 67 | 124 |
| Comparative Example 38 | 33 | 28,100 | 9 | 360 | 94 | 136 |
| Comparative Example 39 | 41 | 27,400 | 14 | 500 or more | 89 | 131 |
| Comparative Example 40 | 20 | 28,300 | 10 | 30 | 93 | 134 |

TABLE 22

|  | MFR (g/10 min) | Flexural Modulus (kg/cm$^2$) | Izod Impact Strength (kg · cm/cm$^2$) | Tensile Elongation (%) | Surface Hardness | Heat Deformation Temperature (°C.) |
| --- | --- | --- | --- | --- | --- | --- |
| Comparative Example 41 | 31 | 27,900 | 12 | 500 or more | 91 | 133 |
| Comparative Example 42 | 25 | 25,300 | 12 | 500 or more | 81 | 131 |
| Comparative Example 43 | 28 | 25,900 | 14 | 500 or more | 84 | 133 |
| Comparative Example 44 | 24 | 26,100 | 11 | 500 or more | 84 | 132 |
| Comparative Example 45 | 26 | 25,000 | 13 | 500 or more | 80 | 131 |
| Comparative Example 46 | 26 | 19,100 | 40 | 500 or more | 72 | 122 |

What is claimed is:

1. A thermoplastic resin composition comprising the following components (A) to (D):

component (A): 50 to 75% by weight of a propylene/ethylene block copolymer wherein said block copolymer has a melt flow rate, MFR, of 10 to 100 g/10 min at 230° C. under a load of 2.16 kg;

wherein the ratio (Mw/Mn) of the weight-average molecular weight (Mw) to the number-average molecular weight (Mn) of the block copolymer is from 5 to 7;

wherein said propylene moiety has MFR of 20 to 200 g/10 min at 230° C. under a load of 2.16 kg; and wherein said propylene moiety has an isotactic pentad rate of 0.98 or higher;

component (B): comprising (B-1) or (B-2) where (B-1) comprises the following two copolymers (B-1-1) and (B-1-2):

(B-1-1): 5 to 10% by weight of an ethylene/buten random copolymer resin having a meltin temperature, measured by a differential scannin calorimeter, of 60 to 100° C. and an MFR of 0.5 t 10 g/10 min at 230° C. under a load of 2.16 kg, an (B-1-2): 5 to 10% by weight of an ethylene/buten random copolymer rubber which does not have melting temperature measured by a differential scan ning calorimeter of higher than 30° C. and has a MFR of 0.5 to 10 g/10 min at 230° C. under a loa of 2.16 kg or (B-2): comprising the following two copolymers (B-2-1 and (B-2-2):

(B-2-1): 7 to 15% by weight of an ethylene/octen random copolymer rubber having a melting tempera ture measured by a differential scanning calorimet of 60 to 90° C. and an MFR of 1.0 to 20 g10 min 230° C. under a load of 2.16 kg, and (B-2-2): 1 to 5% by weight of an ethylene/propylene copolymer rubber having a melting temperature measured by a differential scanning calorimeter of lower than 30° C., being substantially amorphous, having an MFR of 0.5 to 10 g/10 min at 230° C. under a load of 2.16 kg;

component (C): 0.3 to 5% by weight of a block elastomer represented by the following formula I:

polyethylene crystalline moiety.(ethylene/butene random elastomer moiety).polyethylene moiety (I) or formula II:

polyethylene crystalline moiety.(ethylene/butene random elastomer moiety) (II)

wherein said block elastomer has melting temperature measured by a differential scanning calorimeter of 80° to 110° C. and an MFR of 0.5 to 20 g/10 min at 230° C. under a load of 2.16 kg.

wherein said block elastomer consists of 20 to 40% by weight of polyethylene crystalline moiety and 60 to 80% by weight of random elastomer moiety; and component (D): 15 to 25% by weight of talc having an average particle diameter of 5 micrometers or less and a specific surface area of 3.5 m²/g or more.

2. The thermoplastic resin composition according to claim 1, wherein the block elastomer, the component (C), is a hydrogenated product of a butadiene polymer, and the rate of 1,2-polymerization of butadiene in the ethylene/butene random elastomer moiety is from 60 to 90% by weight.

3. The thermoplastic resin composition according to claim 1, having an MFR of 20 g/10 min or more, a flexural modulus of 20,000 kg/cm² or more, an Izod impact strength of 15 kg.cm/cm or more, a tensile elongation of 400% or more, a heat deformation temperature of 120° C. or higher and a Rockwell hardness of 75 or more.

4. A thermoplastic resin composition comprising the following components (A) to (D):

component (A): 50 to 75% by weight of a propylene/ethylene block copolymer wherein said block copolymer has a melt flow rate, MFR, of 10 to 100 g/10 min at 230° C. under a load of 2.16 kg;

wherein the ratio (Mw/Mn) of the weight-average molecular weight (Mw) to the number-average molecular weight (Mn) of the block copolymer is from 5 to 7;

wherein said propylene moiety has MFR of 20 to 200 g/10 min at 230° C. under a load of 2.16 kg; and wherein said propylene moiety has an isotactic pentad rate of 0.98 or higher;

component (B-1-1): 5 to 10% by weight of an ethylene/butene random copolymer resin having a melting temperature measured by a differential scanning calorimeter of 60 to 100° C. and an MFR of 0.5 to 10 g/10 min at 230° C. under a load of 2.16 kg, and component (B-1-2): 5 to 10% by weight of an ethylene/butene random copolymer rubber which does not have a melting temperature measured by a differential scanning calorimeter of higher than 30° C. and has an MFR of 0.5 to 10 g/10 min at 230° C. under a load of 2.16 kg or component (C): 0.3 to 5% by weight of a block elastomer represented by the following formula I:

polyethylene crystalline moiety (ethylene/butene random elastomer moiety) polyethylene moiety (I) or formula II:

polyethylene crystalline moiety. (ethylene/butene random elastomer moiety) (II)

wherein said block elastomer has a melting temperature measured by a differential scanning calorimeter of 80° to 110° C. and an MFR of 0.5 to 20 g/10 min at 230° C. under a load of 2.16 kg.

wherein said block elastomer consists of 20 to 40% by weight of polyethylene crystalline moiety and 60 to 80% by weight of random elastomer moiety; and component (D): 15 to 25% by weight of talc having an average particle diameter of 5 micrometers or less and a specific surface area of 3.5 m²/g or more.

5. The thermoplastic resin composition according to claim 4, wherein the block elastomer, the component (C), is a hydrogenated product of a butadiene polymer, and the rate of 1,2-polymerization of butadiene in the ethylene/butene random elastomer moiety is from 60 to 90% by weight.

6. The thermoplastic resin composition according to claim 4, having an MFR of 20 g/10 min or more, a flexural modulus of 20,000 kg/cm² or more, an Izod impact strength of 15 kg·cm/cm or more, a tensile elongation of 400% or more, a heat deformation temperature of 120° C. or higher and a Rockwell hardness of 75 or more.

7. A thermoplastic resin composition comprising the following components (A) to (D):

component (A): 50 to 75% by weight of a propylene/ethylene block copolymer wherein said block copolymer has a melt flow rate, MFR, of 10 to 100 g/10 min at 230° C. under a load of 2.16 kg;

wherein the ratio (Mw/Mn) of the weight-average molecular weight (Mw) to the number-average molecular weight (Mn) of the block copolymer is from 5 to 7;

wherein said propylene moiety has MFR of 20 to 200 g/10 min at 230° C. under a load of 2.16 kg; and wherein said propylene moiety has an isotactic pentad rate of 0.98 or higher;

component (B-2-1): 7 to 15% by weight of an ethylene/octene random copolymer rubber having a melting temperature measured by a differential scanning calorimeter of 60° to 90° C. and an MFR of 1.0 to 20 g/10 min at 230° C. under a load of 2.16 kg. and component (B-2-2): 1 to 5% by weight of an ethylene/propylene copolymer rubber which does not have a melting temperature measured by a differential scanning calorimeter of higher than 30° C., being substantially amorphous, and has an MFR of 0.5 to 10 g/10 min at 230° C. under a load of 2.16 kg;

component (C): 0.3 to 5% by weight of a block elastomer represented by the following formula I:

polyethylene crystalline moiety.(ethylene/butene random elastomer moiety).polyethylene moiety (I) or formula II:

polyethylene crystalline moiety.(ethylene/butene random elastomer moiety) (II)

wherein said block elastomer has a melting temperature measured by a differential scanning calorimeter of 80° to 110°C. and an MFR of 0.5 to 20 g/10 min at 230° C. under a load of 2.16 kg.

wherein said block elastomer consists of 20 to 40% by weight of polyethylene crystalline moiety and 60 to 80% by weight of random elastomer moiety; and component (D): 15 to 25% by weight of talc having an average particle diameter of 5 micrometers or less and a specific surface area of 3.5 m$^2$/g or more.

8. The thermoplastic resin composition according to claim 7, wherein the block elastomer, the component (C), is a hydrogenated product of a butadiene polymer, and the rate of 1,2-polymerization of butadiene in the ethylene/butene random elastomer moiety is from 60 to 90% by weight.

9. The thermoplastic resin composition according to claim 7, having an MFR of 20 g/10 min or more, a flexural modulus of 20,000 kg/cm$^2$ or more, an Izod impact strength of 15 kg·cm/cm or more, a tensile elongation of 400% or more, a heat deformation temperature of 120° C. or higher and a Rockwell hardness of 75 or more.

* * * * *